United States Patent
Paletta (10) Patent No.: US 6,702,520 B2
(45) Date of Patent: Mar. 9, 2004

(54) MULTI-PURPOSE REHABILITATION OF CONDUITS

(75) Inventor: Stephen Paletta, Bedford, NY (US)

(73) Assignee: C.I. Technologies, Whitestone, NY (US)

( * ) Notice: Subject to any disclaimer, the term of this patent is extended or adjusted under 35 U.S.C. 154(b) by 13 days.

(21) Appl. No.: 09/852,608

(22) Filed: May 10, 2001

(65) Prior Publication Data

US 2002/0044837 A1 Apr. 18, 2002

Related U.S. Application Data (60) Provisional application No. 60/203,452, filed on May 10, 2000.

(51) Int. Cl.[7] ............................. F16L 1/00; F16L 55/18
(52) U.S. Cl. ............................. 405/184.3; 405/184.1
(58) Field of Search ................ 138/114–117, 97–98; 405/150.1, 154.1, 174, 178, 184, 184.1, 184.2, 184.3, 184.5; 285/123.1, 123.5, 124.1

(56) References Cited

U.S. PATENT DOCUMENTS

| | | | |
|---|---|---|---|
| 353,680 A | | 12/1886 | Hurlbut |
| 417,992 A | | 12/1889 | Dell |
| 2,014,666 A | | 9/1935 | Peik |
| 2,340,926 A | | 2/1944 | Bradley |
| 3,110,754 A | | 11/1963 | Witort |
| 3,357,455 A | * | 12/1967 | Plummer ............ 138/106 |
| 3,379,221 A | | 4/1968 | Harry |
| 3,495,628 A | * | 2/1970 | Boender ............ 138/114 |
| 3,976,129 A | | 8/1976 | Silver |
| 4,157,194 A | | 6/1979 | Takahashi |
| 4,384,624 A | * | 5/1983 | Duke et al. ............ 175/19 |
| 4,440,195 A | | 4/1984 | van Dongeren |
| 4,496,823 A | | 1/1985 | Mann |
| 4,729,409 A | | 3/1988 | Paul |
| 4,731,505 A | | 3/1988 | Crenshaw |
| 4,738,565 A | | 4/1988 | Streatfield |
| 4,804,020 A | | 2/1989 | Bartholomew |

(List continued on next page.)

OTHER PUBLICATIONS

TT Technologies, A Guide to Pneumatic Pipe Bursting with the Grundocrack System, 1999, USA.
TT Technologies, Expand your Pipe Bursting Knowledge, 1999, USA.
TT Technologies, Grundocrack Parts and Accessories Catalog for Pipe Bursting Products, 1999, USA.

*Primary Examiner*—Jong-Suk Lee
*Assistant Examiner*—Sunil Singh
(74) *Attorney, Agent, or Firm*—Ostrager Chong & Flaherty LLP (57) ABSTRACT

Methods and apparatuses for rehabilitating and increasing the functionality of existing underground conduits wherein a plurality of conduits are simultaneously inserted into an existing conduit by bursting the existing conduit to create a tunnel and inserting a plurality of new conduits into the tunnel, such that at least one of the new conduits has a capacity equal to or greater than the capacity of the existing conduit, are provided. The new conduits are either separate from or removeably connected to one another, such that the new conduits are capable of being diverted from the tunnel at separate locations and the new conduit system can be used primarily for carrying media similar to that of the original conduit or additionally for completely different and unrelated media such as fiber optic cable, coaxial cable or electrical cable.

19 Claims, 11 Drawing Sheets

U.S. PATENT DOCUMENTS

| | | |
|---|---|---|
| 4,906,496 A | 3/1990 | Hosono |
| 4,983,071 A | 1/1991 | Fisk |
| 5,054,677 A | 10/1991 | Carruthers |
| 5,078,546 A | 1/1992 | Fisk |
| 5,395,472 A | 3/1995 | Mandich |
| RE35,271 E | 6/1996 | Fisk |
| 5,525,049 A | 6/1996 | Paletta |
| 5,587,554 A | 12/1996 | Kendrick, Jr. |
| RE35,542 E | 6/1997 | Fisk |
| 5,765,598 A * | 6/1998 | Goddard et al. ............ 138/115 |
| 5,816,745 A | 10/1998 | Tenbusch, II |
| 5,971,029 A | 10/1999 | Smith |
| 6,058,978 A | 5/2000 | Paletta |
| 6,109,832 A * | 8/2000 | Lincoln ...................... 405/184 |
| 6,199,595 B1 * | 3/2001 | Baker ..................... 138/115 X |
| 6,302,448 B1 | 10/2001 | Van Der Meer |
| 6,305,880 B1 * | 10/2001 | Carter et al. ............ 405/184.3 |

* cited by examiner

MULTI-PURPOSE REHABILITATION OF CONDUITS

PRIORITY CLAIM

This Application claims priority to, and incorporates by reference, U.S. Provisional Patent Application No. 60/203,452, which was filed on May 10, 2000.

FIELD OF THE INVENTION

This invention generally relates to the rehabilitation and improvement of utility conduits, including sewer, water, electrical, natural gas, telephone, telecommunication and similar systems. More particularly, the invention relates to the rehabilitation of conduits such that they may serve their originally intended uses while adding new functionality to the conduits.

BACKGROUND OF THE INVENTION

In recent years, the industry concerned with the rehabilitation of existing water, sewage, natural gas or similar pipelines has grown dramatically as existing infrastructure is found wanting either because of its deterioration or its inability to manage the volume of materials which currently need to be transported.

A parallel, yet separate, industry, which is concerned with telecommunications cable, including high speed fiber optic lines for computer or cable television, and various other uses, is similarly expanding its capacity and reach. However, in many cases this industry is creating new infrastructure, rather than rehabilitating existing lines. The costs involved in expanding telecommunications networks are prohibitive and, unlike water systems, may be indefinitely postponed if costs are excessive. This problem is particularly acute in lower density population areas where the returns on investment in expensive telecommunications lines may be much lower than in more populous areas.

Various methods for replacing or rehabilitating existing conduits are known. The most basic method involves digging up existing pipe and replacing it length by length. U.S. Pat. No. 353,680 to Hurlbut discloses replacement pipes which have multiple chambers for carrying different media. However, the "dig and replace" method is extremely expensive, slow and unnecessarily disturbs the ground surface above the entire length of the conduits.

A improvement over this method essentially comprises digging an access trench or entering manholes at both ends of an old conduit and feeding a new conduit through the length of the old conduit so that the existing conduit is left as a casing around the new conduit. Some of these methods are described in U.S. Pat. Nos. 5,525,049 and 6,058,978, both to Paletta. These methods result in an easier, more efficient and cheaper conduit replacement process that does not disturb the ground above the conduit except for the access trench locations, when necessary. Methods for modifying a pipe so that is becomes a dual containment pipe are also disclosed.

Further examples of patents concerning pipe rehabilitation include U.S. Pat. No. 5,395,472 to Mandich and U.S. Pat. No. 5,971,029 to Smith et al. which concern a second replacement conduit being placed within the first replacement conduit in a two step process so that a space remains between the two liners. The space may contain, for example, a sensing system to detect leaks in the inner most conduit.

U.S. Pat. No. 4,738,565 to Streatfield et al.; U.S. Pat. No. 5,054,677 to Carruthers; U.S. Pat. Nos. 4,983,071; 5,078,546; Re. 35,271; and Re. 35,542, all to Fisk et al. disclose pipe-bursting and spreading methods and apparatuses which can be used to expand the inner diameter of an existing conduit from the inside. The existing conduit is destroyed or spread as an expansion apparatus pushes out from within the conduit and simultaneously compacts the soil which surrounds the conduit. The result is a tunnel which has a larger internal diameter than the original conduit, such that a replacement conduit inserted therein may have an internal diameter which is equal to or larger than the original conduit.

Thus, there is a need for methods for installing replacement or rehabilitating existing utility conduits while simultaneously installing new conduits suitable for telecommunications or other cables in one step, such that existing infrastructure may be utilized and multiple installation procedures may be avoided. Further, there is a need for an installation method which allows costs to be shared by multiple industries. Also, there is a need for a method for simultaneously installing multiple conduit arrangements without reducing the capacity of the original conduit. In addition, there is a need for a system which easily accommodates the needs of different industries by providing uncomplicated methods for separating multiple conduit arrangements such that they can be directed to different destinations or separate independent networks so that system access, maintenance and upgrading remains as efficient as possible.

SUMMARY OF THE INVENTION

The present invention provides a method for rehabilitating a conduit which comprises bursting a first conduit to create a tunnel, and inserting a plurality of new conduits into the tunnel, such that at least one of the new conduits has a capacity equal to or greater than a capacity of the first conduit.

The invention further provides a method wherein the new conduits are inserted simultaneously and are either separate from or removeably connected to one another, such that the new conduits are capable of being diverted from the tunnel at separate locations.

In accordance with another preferred embodiment a method for rehabilitating a conduit which comprises bursting a first conduit to create a tunnel, and inserting a new conduit into the tunnel, the new conduit comprising a plurality of channels, such that at least one of the channels has a capacity equal to or greater than a capacity of the first conduit.

In other preferred embodiments the invention provides methods for simultaneously inserting multiple conduits for various uses into an existing conduit.

The invention further provides methods and related apparatuses for bursting existing conduits to create tunnels, installing new conduits into the tunnels and diverting the new conduits or conduit channels from one another such that they can be directed to different locations.

The invention further provides a junction between two multi channel conduits and a multi channel conduit with an outer annular region which is particularly suitable for drilling such that a central bore may thereby be accessed.

Other objects, features and advantages of the present invention will be apparent when the detailed description of the preferred embodiments of the invention are considered in conjunction with the drawings, which should be construed in an illustrative and not in a limiting sense.

DETAILED DESCRIPTION OF THE PREFERRED EMBODIMENTS

Figure 1:
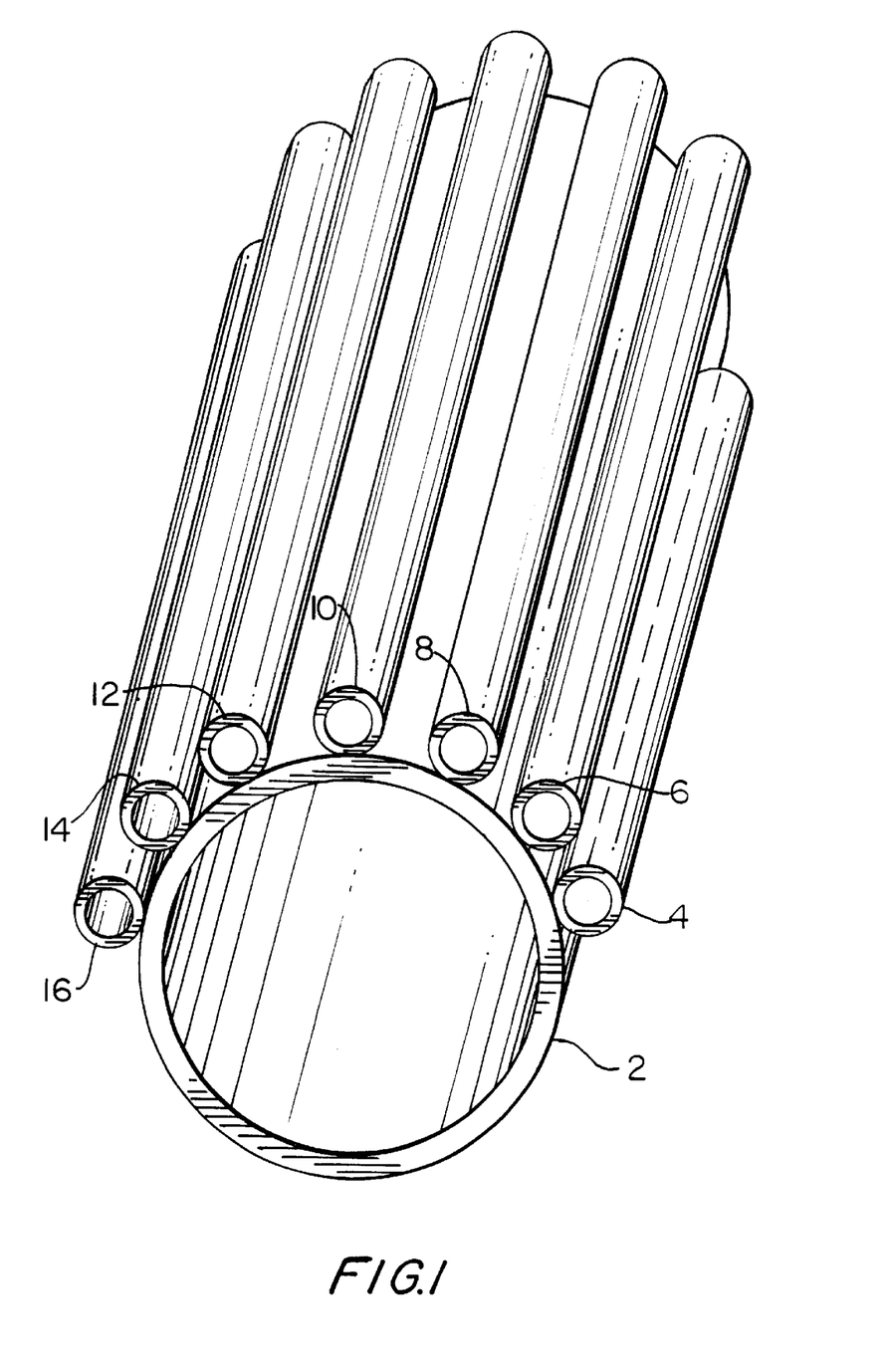
FIG. 1 is a perspective view of a preferred embodiment of the invention showing a multiple conduit arrangement.

In a preferred method of the invention, multiple conduits, such as those shown in FIG. 1, are inserted into an existing conduit or a tunnel which is created by bursting or spreading the inner walls of an existing conduit outward to form a tunnel. Methods and apparatuses related to pipe bursting are described in U.S. Pat. No. 4,738,565 to Streatfield et al.; U.S. Pat. No. 5,054,677 to Carruthers; U.S. Pat. Nos. 4,983,071; 5,078,546; Re. 35,271; and Re. 35,542, all to Fisk et al., all of which are incorporated herein by reference (Hereafter referred to as "pipe bursting patents").

Pipe bursting entails the insertion of a device into a conduit, such as an existing water pipe, and applying pressure to the interior surface of the conduit so that it breaks apart or is spread apart after it is cut down its length. The medium surrounding the conduit, such as soil, is simultaneously compressed by the outward force of the apparatus so that, after the operation is complete, a tunnel with an interior diameter larger than the outer diameter of the original conduit generally results. The walls of this tunnel are generally lined with pieces of conduit and compressed soil. Alternatively, existing conduits may be reamed before new conduits are installed. Reaming is generally defined as a process by which the inner diameter of an existing conduit is increased by cutting or grinding the inner surface of the conduit. As used herein, the term "bursting" or "pipe bursting" refers to any method for expanding the inner diameter of an existing conduit including, but not limited to, the methods and apparatuses detailed below, those described in the aforementioned pipe bursting patents, and other methods, including reaming, which are well known by those familiar with conduit rehabilitation. Various pipe bursting techniques may be used to burst almost any pipe, including, but not limited to those formed of vitrified clay, reinforced concrete, cast iron, ductile iron, asbestos cement and steel.

The advantage of these methods is that a new conduit that has an inner diameter at least as large as the original conduit may be inserted into the tunnel. Thus, in situations where, for example, a sewer line to a home needs to be replaced because of leaking, pipe bursting allows for the insertion of a new conduit which has equal or greater capacity to that of the original conduit. For example, an 8" diameter conduit can be replaced with a 12" diameter conduit. This is important in applications where the original conduit is at maximum capacity and the use of a smaller diameter conduit is unacceptable. In technologies using inner sleeves or liners which are inserted into existing conduits, without pipe bursting, it is necessarily the case that the new conduit will have an inner diameter, and capacity, which is somewhat less than the original conduit because the thickness of the liner material occupies some of the inner diameter of the original conduit.

FIG. 1 shows one possible arrangement when a relatively larger diameter conduit 2, such as that which may be suitable for water or sewage is inserted into a tunnel, after pipe bursting, along with relatively smaller diameter conduits 4, 6, 8, 10, 12, 14 and 16 which may, for example, be suitable for fiber optic, electrical, coaxial or other cables. Conduits 4, 6, 8, 10, 12, 14 and 16 may also be used to carry fluids or gas depending on the circumstances. The conduits may be manufactured from a variety of materials including at least high density polyethylene, extra high molecular weight polyethylene, medium density polyethylene, polypropylene, polyvinyl chloride or similar materials. Rigid conduits, such as those formed from steel or ductile iron, can also be installed. However, most preferred embodiments utilize a flexible plastic pipe. When rigid conduits are used, there must be sufficient space in the trench or manhole so that sections of conduit may be lowered to the existing conduit without the need for significant bending of the new conduit section. Conduits intended for carrying water or sewage will preferably range in size from approximately 4" to 18", and conduits for fiber optic and other cables are preferably in the range of 1 cm to 5 cm. However, the invention may be used to rehabilitate conduits with a 36" diameter, or larger. Conduits are typically installed in lengths of 200' to 500' but may be installed in shorter or much longer sections depending on the type of conduit used and the existing field conditions. Conduits may be joined to one another to increase their overall length by various known methods, including butt fusion. Though a plurality of new conduits may be inserted into an existing conduit, pipe-bursting methods allow, if desired, at least one of the new conduits, conduit 2 as depicted in FIG. 1, to have an inner diameter, and consequential capacity, at least as large as the original conduit which is being replaced (not shown).

In most applications it is beneficial for at least one of the new conduits to have a capacity substantially equal to or greater than the capacity of the existing conduit, though a conduit with a smaller capacity may suffice if its capacity is large enough to handle the media which is carried by the existing conduit, since the existing conduit may not utilize its full capacity. Notably, a new conduit with a smaller diameter may have an equal or even greater capacity than a larger diameter existing conduit because the new conduit may have a smaller C factor (roughness coefficient), i.e. better flow properties.

Conduits 4–16 need not be attached, though they may be attached, to conduit 2. If they are attached it is generally preferred that they be detachable after installation so that they may be diverted to a destination(s) separate from conduit 2. Also, conduits 4–16 may have related or different purposes from one another. Thus, in one possible arrangement, conduit 2 will carry sewage away from a building, conduit 4 will house fiber optic cable and conduit 6 will house coaxial cable. In the most preferred method the new conduits are installed without data or cables therein, as these cables can easily be blown or pulled through the conduits at a later date to meet specific needs. However, any of the conduits shown in FIG. 1 could themselves be fiber optic or other data lines, rather than hollow conduits which will house data cables at some time in the future.

Further, conduits 2–16 need not share a common source or destination, so long as they need to travel the same route for any distance these methods are appropriate. In this example, the cost of pipe bursting, if done, and insertion of replacement conduits may be shared, for example, among telecommunications, gas and electric companies and a municipal sewage department.

Figure 2A:
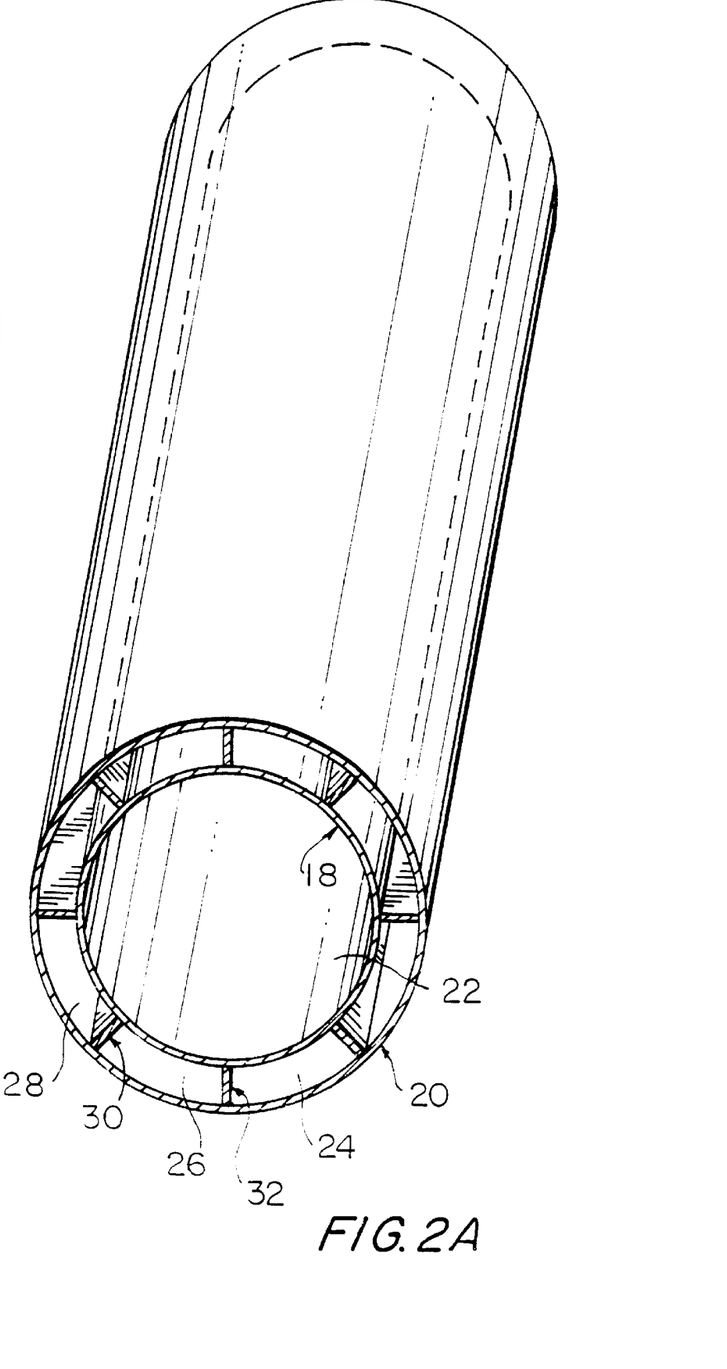
FIGS. 2(a) and 2(b) are perspective views of other preferred embodiments of the invention showing a single conduit with multiple channel arrangements.

FIG. 2(a) shows a similar arrangement where an inner wall 18/outer wall 20 assembly is inserted into a tunnel such that inner channel 22 is created, and has, preferably, though not necessarily, an inner diameter at least equal to the old conduit, and outer channels 24, 26 and 28 are created by baffles or compartment separators 30 and 32. Channels 22, 24, 26 and 28 and conduits 2–16 (FIG. 1) may contain cables, wiring or roping (which may be used to pull cables through at a later date) during installation or may remain essentially empty and available for insertion of various cables or media as the need arises.

Figure 2B:
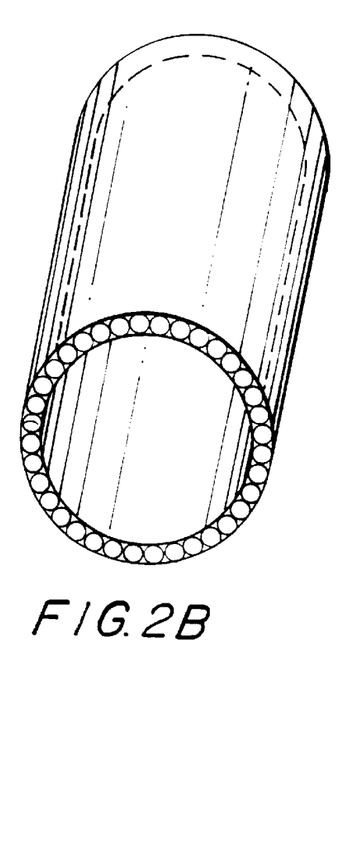

FIG. 2(b) is an alternate embodiment in which the outer channels are cylindrical in shape.

Though not shown in the figures, "Fold and Form" technology may also be utilized to install new conduits into a tunnel. Methods and apparatuses related to this system are described fully in U.S. Pat. Nos. 5,525,049 and 6,058,978, both to this applicant, and are incorporated herein by reference. These systems essentially comprise the insertion of a folded liner into existing conduits, expanding them against the inner surface of the existing conduits and setting them to form a permanently relined conduit. Additional liners may be inserted within the first liner which is distanced from the first liner with spacer members. The descriptions of "trenchless rehabilitation" in these patents are complimentary to the methods described in the present application.

Figure 3:
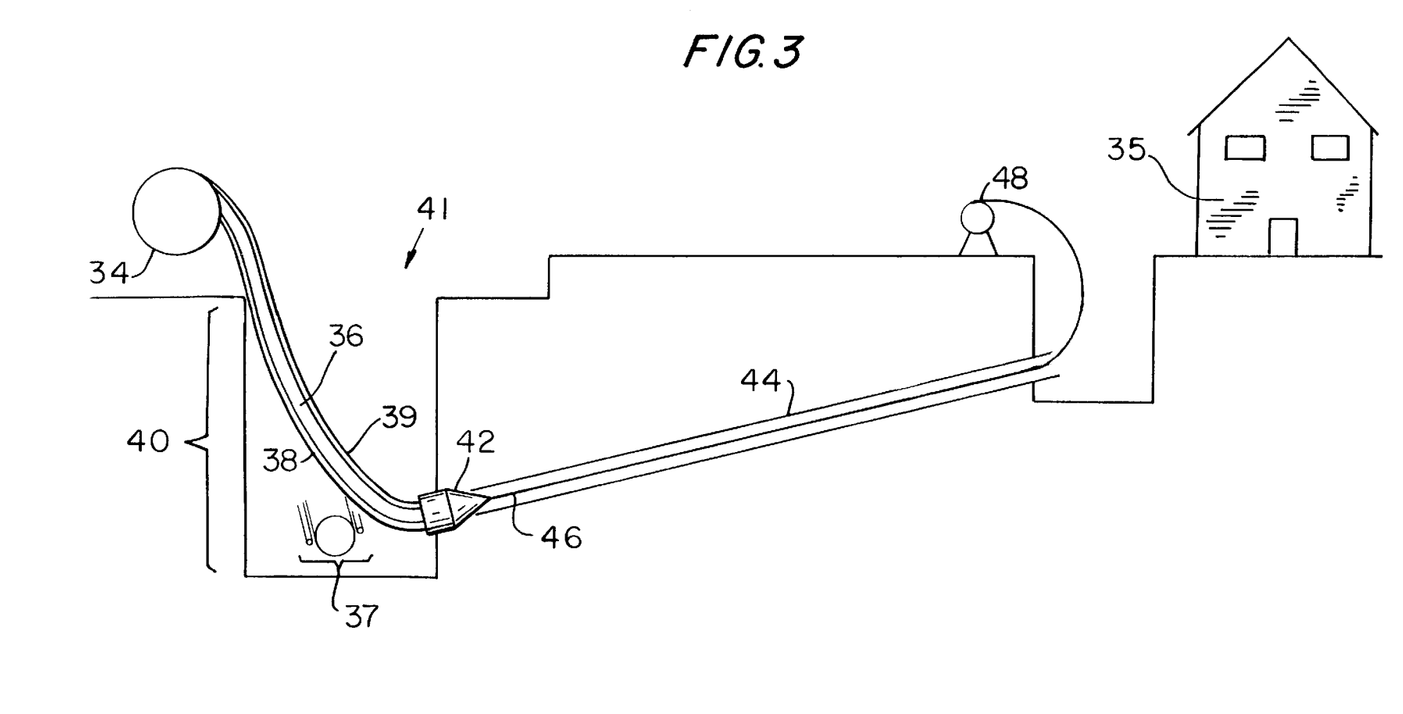
FIG. 3 is a perspective view showing a preferred arrangement which may be used to perform a bursting/conduit replacement method of the invention.

FIG. 3 shows a preferred arrangement for installing a multi-conduit system. A reel 34 of coiled pipe 36 (4" in this example) and multiple fiber pipes 38, 39 (11 mm in this example) are pulled into an access pit 40 where the pipes are attached to a bursting head 42. The bursting head 42 is pulled through an existing conduit 44 by a cable or rod 46, which is attached to a winch 48 at the other end of the existing conduit 44. Since the outer diameter of the bursting head 42 is larger in diameter than the existing conduit 44, the bursting head 42 breaks apart the existing conduit 44 as it moves (to the right as shown in FIG. 3) creating a tunnel whose diameter is larger than the original conduit. The bursting action may be enhanced by means of a hammering action that is created by the pulling head itself. This "hammering" action can be caused by pneumatic or hydraulic devices as explained in the aforementioned pipe bursting patents. The conduits 36, 38, 39 are simultaneously pulled in behind the bursting head 42 so that in one step a tunnel is created along the path of the existing conduit 44 and a multi-conduit arrangement is installed therein. In this embodiment, the new conduits may be connected at one end to a house 35 and at another end to other conduits 37 running down the center of a street 41. Alternatively, the bursting head 42 may be pushed or pulled through the existing conduit by various other methods known in the industry which may or may not require a winch or similar apparatus.

Figure 4:
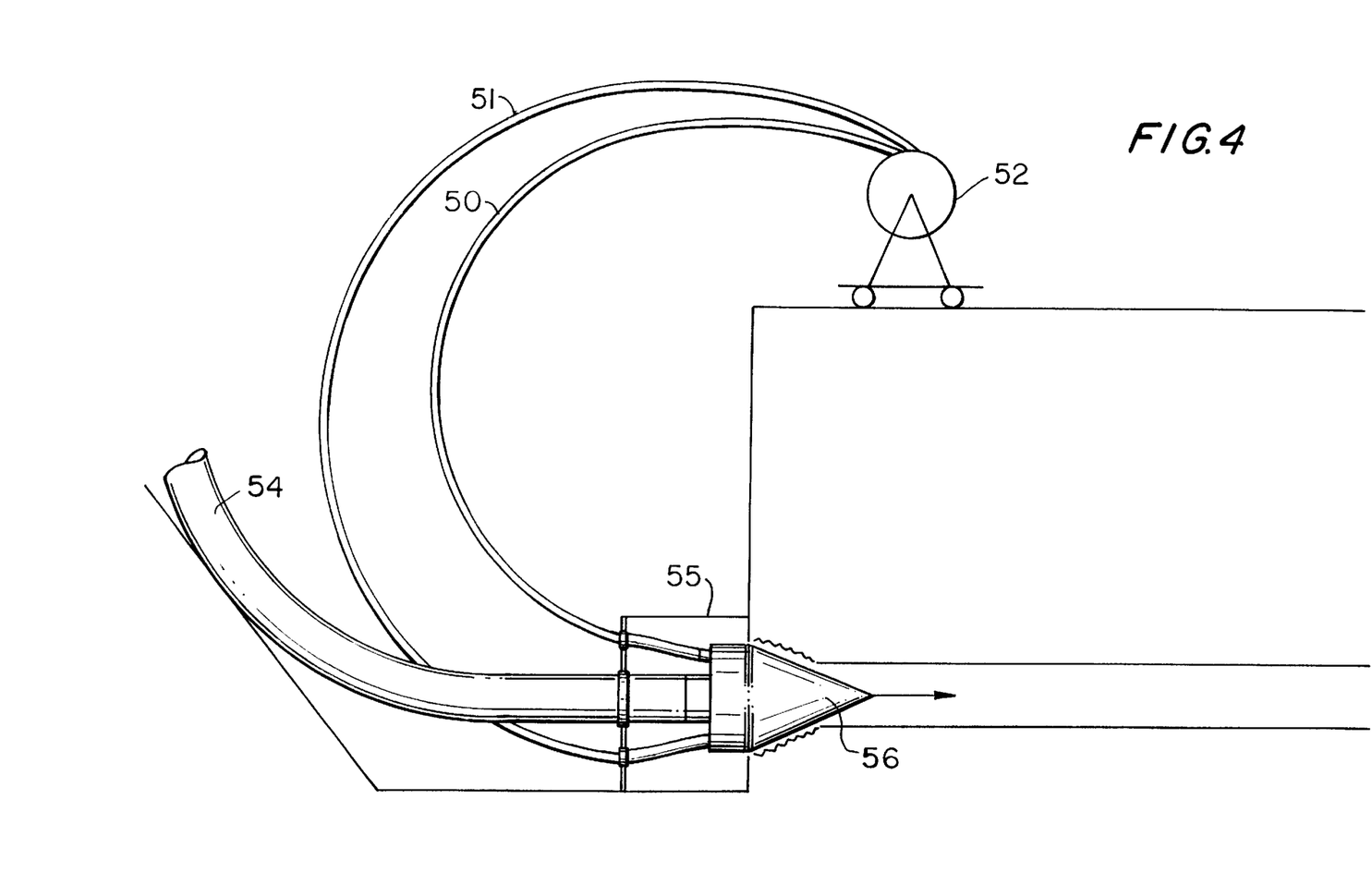
FIG. 4 is a perspective view showing a close up view of another preferred arrangement which may be used to perform a bursting/conduit replacement method of the invention.

FIG. 4 is a close-up view of a similar arrangement where two lengths of 1.25" conduit 50, 51 are fed from reel 52 while a larger diameter conduit 54 is fed from a second reel (not shown) through an alignment collar 55 to a bursting head 56 with larger dimensions than that shown in FIG. 3.

Figure 5:
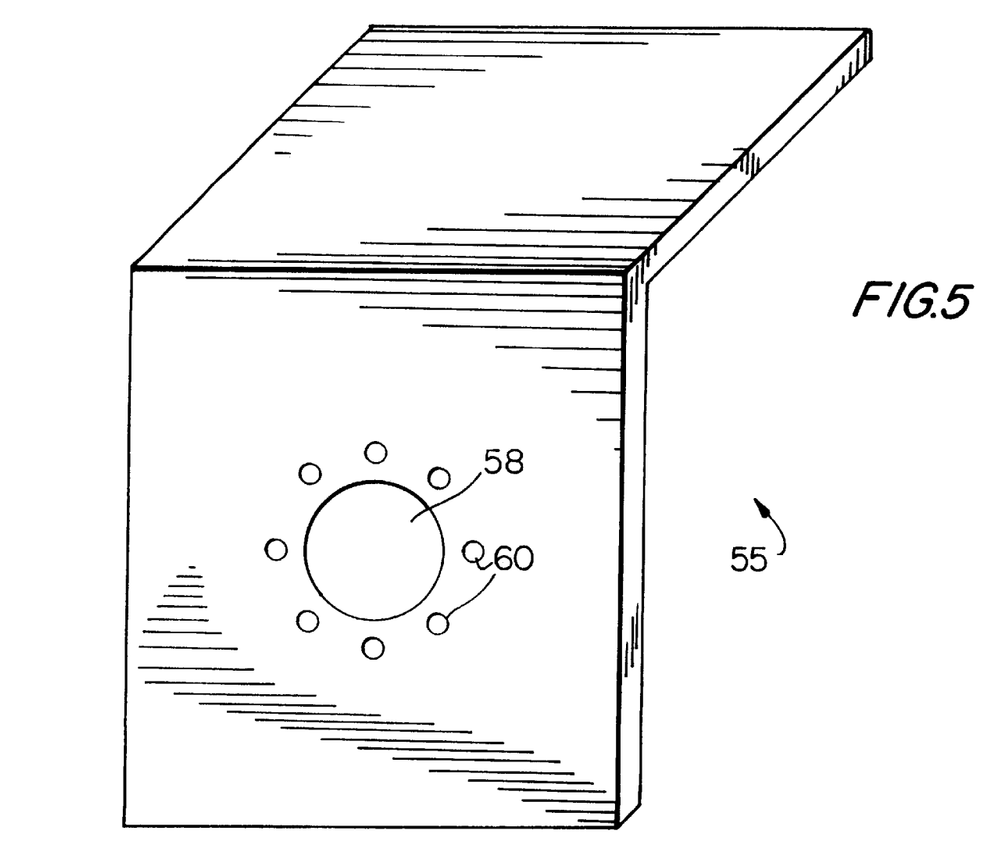
FIG. 5 is a perspective view of a preferred alignment collar of the invention.

FIG. 5 is a detailed view of a preferred alignment collar 56 which may be bracketed in place in a position as shown in FIG. 4 so that, just prior to insertion within the tunnel, the larger pipe 54 can be aligned by larger guide aperture 58 and conduits 50, 51 can be aligned through any of smaller guide apertures 60. The invention may be practiced without the collar, but the collar is helpful for aligning new conduits in deep trenches where the new conduits are bent to a relatively large degree prior to their insertion in the tunnel.

Figure 6:
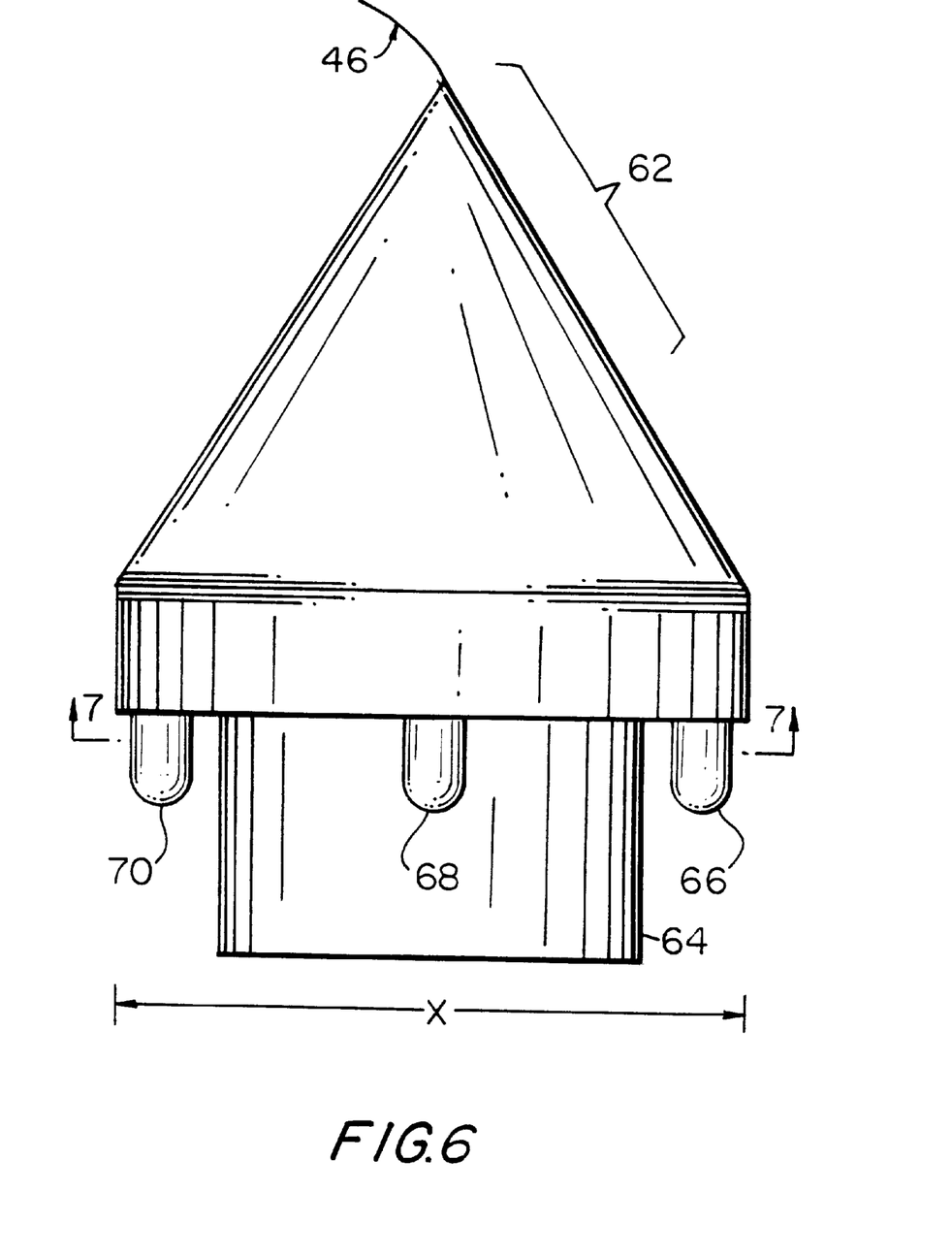
FIG. 6 is a left side view of a preferred bursting head of the invention.

FIG. 6 shows a side view of a bursting head (ref. numeral 42 in FIG. 3; ref. numeral 56 in FIG. 4). The bursting head may be in a variety of shapes and sizes, though it is preferred that the bursting head tip 62 be cone shaped or rounded or at least of a smaller diameter than the existing conduit so that it will easily enter into it. At its widest point, the diameter, as measured along line "X" is preferably the same or slightly less than the diameter of the existing conduit in applications where the new conduits are being installed inside the existing conduit. Where, as is most preferred, the existing conduit is being bursted to create a larger tunnel, the diameter must be larger than the inner diameter of the existing conduit. In this embodiment it is the force created by the winch 48 (FIG. 3), which is connected by a cable 46 to the bursting head tip 62, which bursts the pipe, so the bursting head itself need not, unless field conditions make it necessary, include the mechanical structure detailed in the aforementioned pipe bursting patents.

The bursting head further includes flanges 64, 66, 68 and 70 to which the new conduits attach before the pulling procedure. Conduit 54 (FIG. 4) may connect to flange 64, and conduits 50, 51 (FIG. 4) may connect to any two of flanges 66, 68 and 70. The number of flanges surrounding flange 64 may vary depending upon the application.

Figure 7:
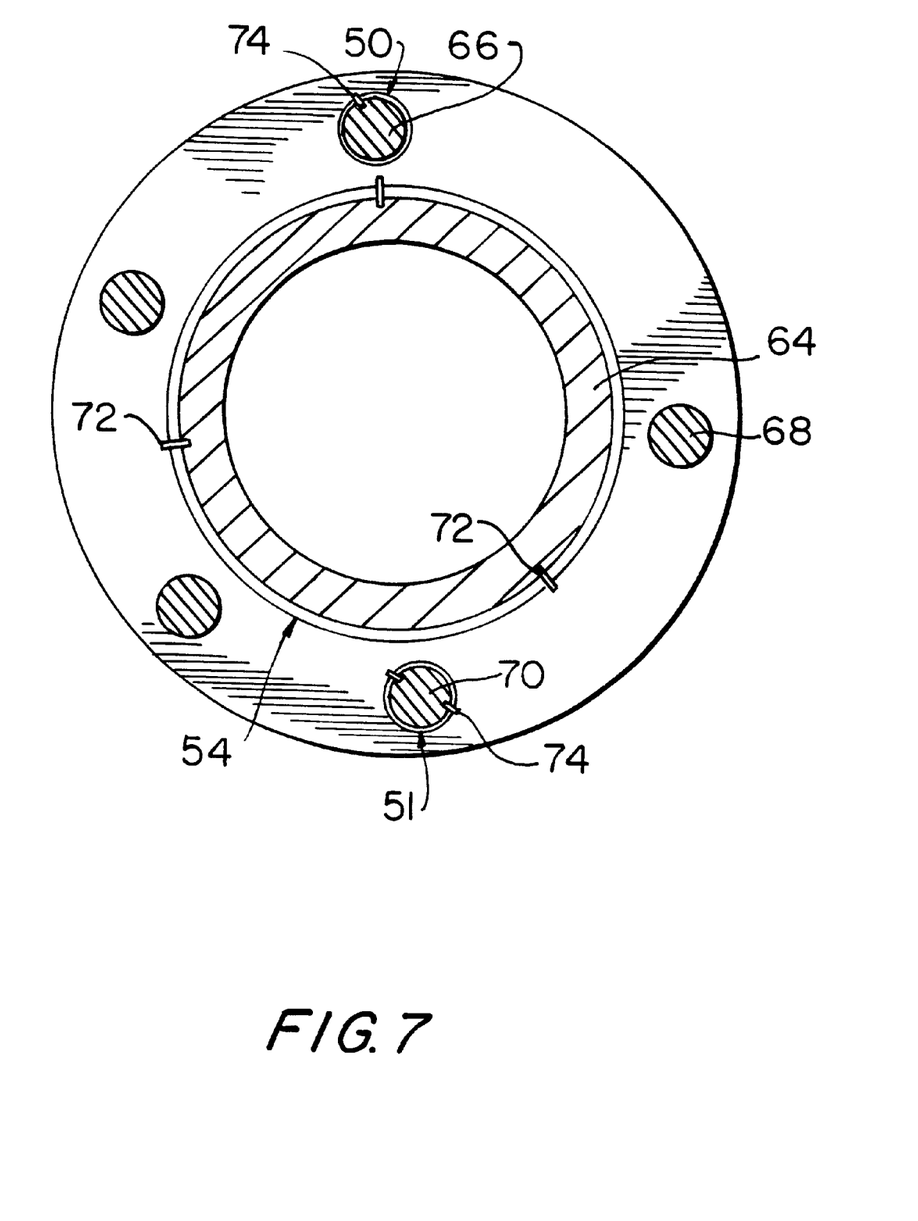
FIG. 7 is a cross sectional view of the bursting head shown in FIG. 6, taken along line 7—7.

FIG. 7 is a cross section along line 7 (FIG. 6) of the bursting head. As seen in FIG. 7, flange 64 fits inside of an end of conduit 54 and is removeably affixed thereto with fastening devices 72, such as bolts, screws or pins, during the pulling process. In similar fashion, flanges 66 and 70 fit inside ends of conduits 50 and 51, respectively, and are removeably affixed thereto with fastening devices 74 during the pulling process. Other embodiments may include flanges which attach to the outside of the conduits by surrounding a portion of the conduit outer surface. The exact manner in which the conduits are attached to the bursting head is not critical, so long as the conduits may readily be attached at one manhole or access trench and detached at another after being pulled through the tunnel. The flanges may be removeably connected to a variety of conduits including, but not limited to, those shown in FIGS. 2(a) and 2(b), which, in a preferred method, would be connected to flange 64.

Figure 8:
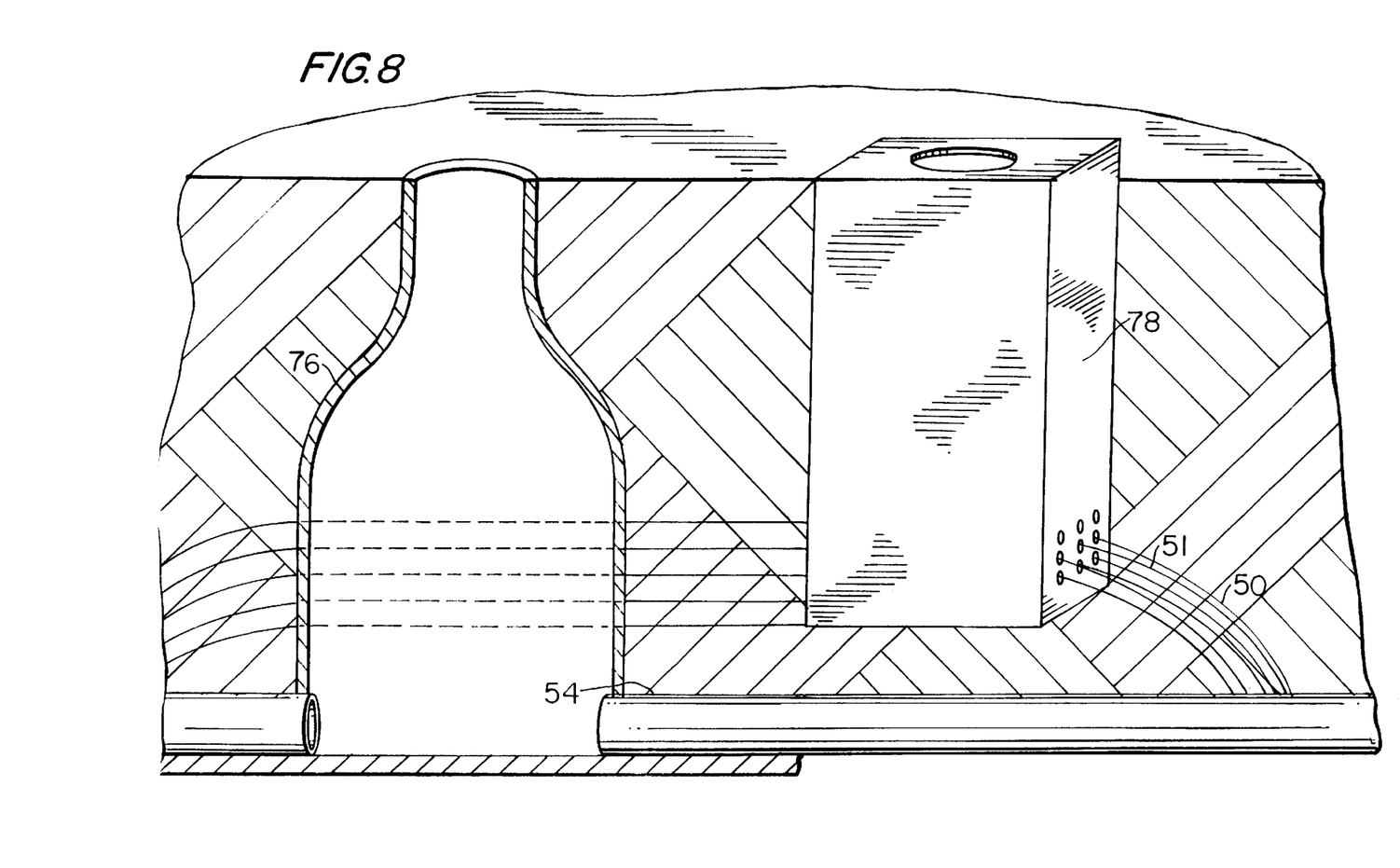
FIG. 8 is a perspective view of a preferred arrangement of the multiple conduit system of the invention after installation.

FIG. 8 is a perspective view of a preferred arrangement of the multiple conduit system of the invention after installation. FIG. 8 shows one preferred arrangement whereby the conduit 54 runs directly to, and is accessible from, the sewer manhole 76. While conduits 50 and 51 diverge from conduit 54 and lead to a telecommunications manhole 78. Notably, conduit 54 does not enter the telecommunications manhole 78 and conduits 50 and 51 do not enter the sewer manhole 76. Thus, even though all conduits are installed together for the majority of their lengths, they diverge from one another so that maintenance may be conducted independently on each system. In other embodiments, conduits 50 and 51 may enter the sewer manhole, if desired. As shown in FIG. 8 the sewer pipe 54 does not continue through the manhole but, instead, ends at one end of the manhole and continues at the other. This is generally the case, but the arrangement may vary.

Figure 9A:
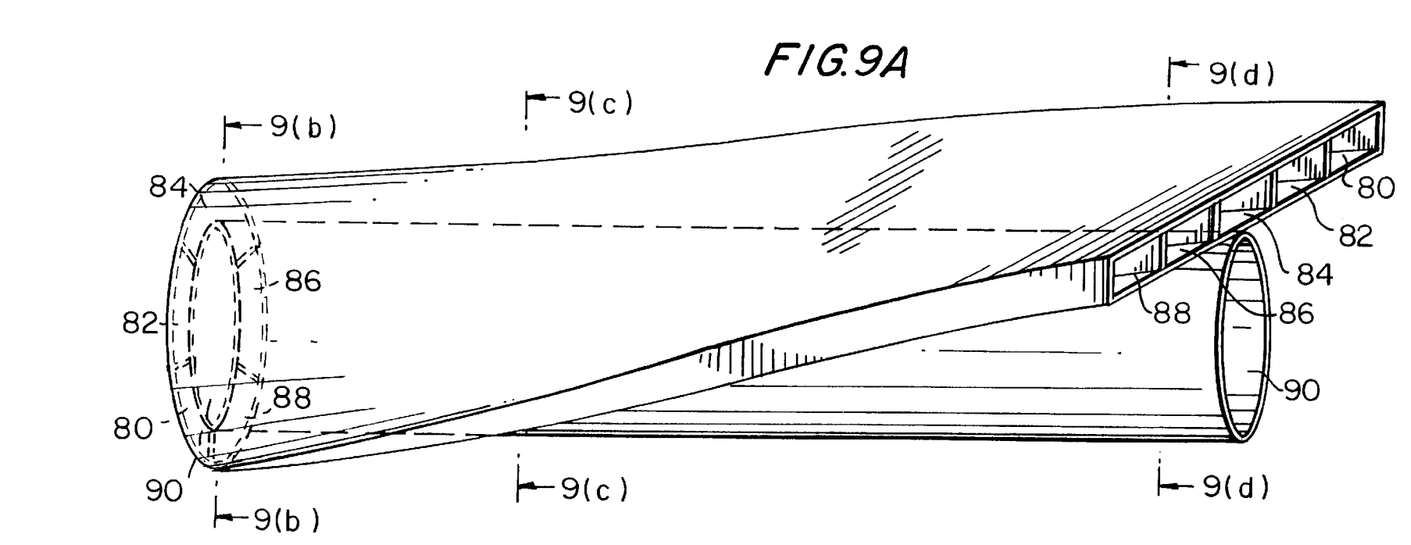
FIG. 9(a) is a perspective view of an adapter which may be used with multi channel conduits.
Figure 9B:
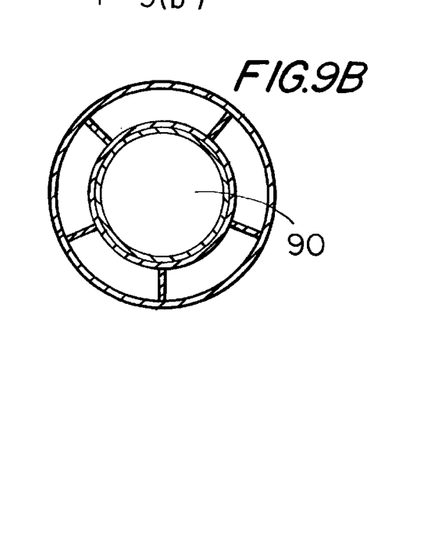
FIGS. 9(b), 9(c) and 9(d) are cross sectional views of the adapter shown in FIG. 9(a), taken along lines 9(b), 9(c) and 9(d), respectively.
Figure 9C:
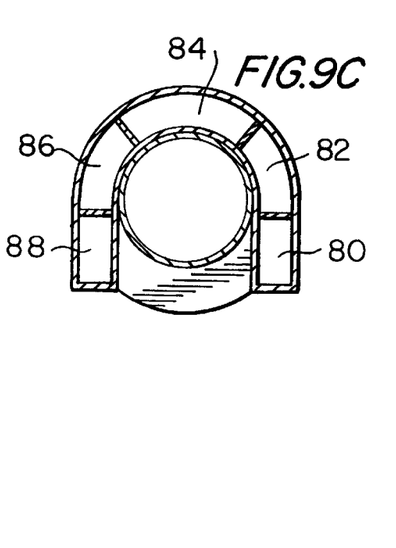
Figure 9D:
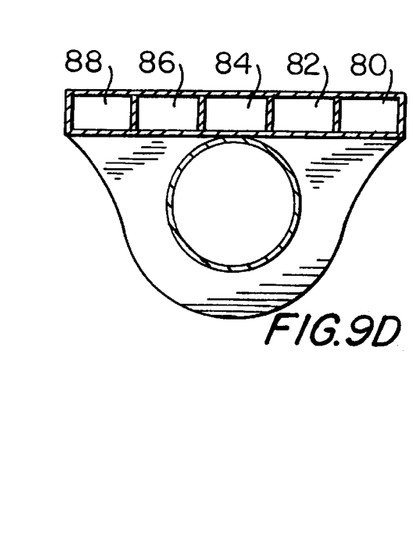

FIG. 9(a) is a perspective view of an adapter which may be used with the multi channel conduits shown in FIGS. 2(a) and 2(b) so as to achieve a diversion of the smaller channels in a similar manner to that shown in FIG. 8. The adapter redirects channels 80, 82, 84, 86 and 88 from a position on the outer circumference of channel 90 (line 9(b)) to a position at one circumferential point of channel 90 (line 9(d)), where channels 80–88 can be further diverted as a group or independently to different destinations. In a preferred embodiment, the total length of the adapter (from lines 9(b) to 9(d)) may be approximately 10 feet. FIGS. 9(b), 9(c) and 9(d) are cross sectional views of the adapter through lines 9(b), 9(c) and 9(d), respectively.

Figure 10:
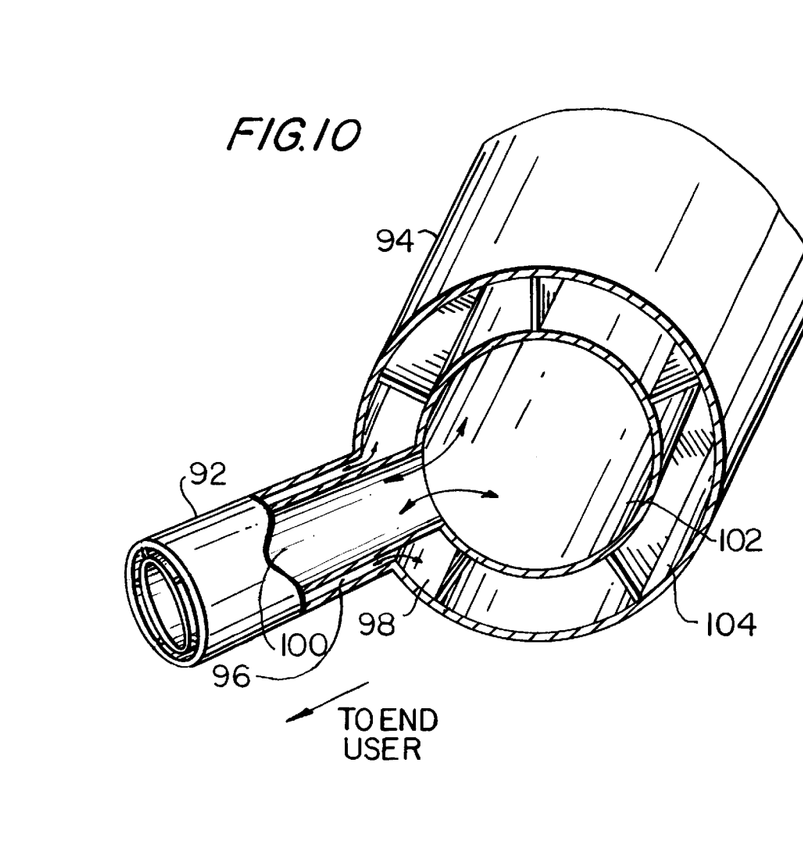
FIG. 10 is a perspective view of one preferred arrangement of the invention showing a junction between two multi channel conduits.

FIG. 10 shows a preferred method of connecting a smaller multi channel conduit to a larger multi channel conduit so that, for instance, a home may gain access to a combination water main/telecommunications conduit arrangement. As shown in FIG. 10, a smaller pipe 92 may be branched off from a main conduit 94 in such a manner that an outer chamber 96 of conduit 92 is in communication with an outer chamber 98 of conduit 94. Further, inner channel 100 of conduit 92 is in communication with inner channel 102 of conduit 94. Thus, for example, channels 100 and 102 could carry water or sewage and channels 96 and 98 could carry fiber optic cable. A similar arrangement could be placed in channel 104 for, as an example, a house across the street from the house connected by conduit 92.

Figure 11:
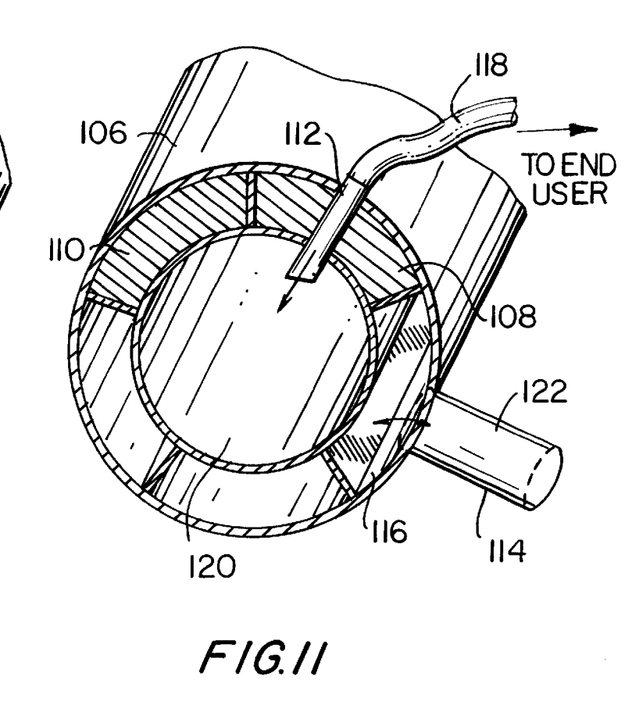
FIG. 11 is a perspective view of another preferred arrangement of the invention showing an arrangement for connecting an end user to a multi channel conduit.

FIG. 11 shows another arrangement wherein channels 108 and 110 of conduit 106 are comprised of a solid material, such as plastic, which may be easily drilled or tapped by a tap 112 so that conduit 118 is in communication with channel 120 and gas or steam may be directed to an end user. In this arrangement, another conduit 114 may be attached to conduit 106 such that channel 116 is in communication with channel 122 and fiber optic cables may be run to the end user.

Figure 12:
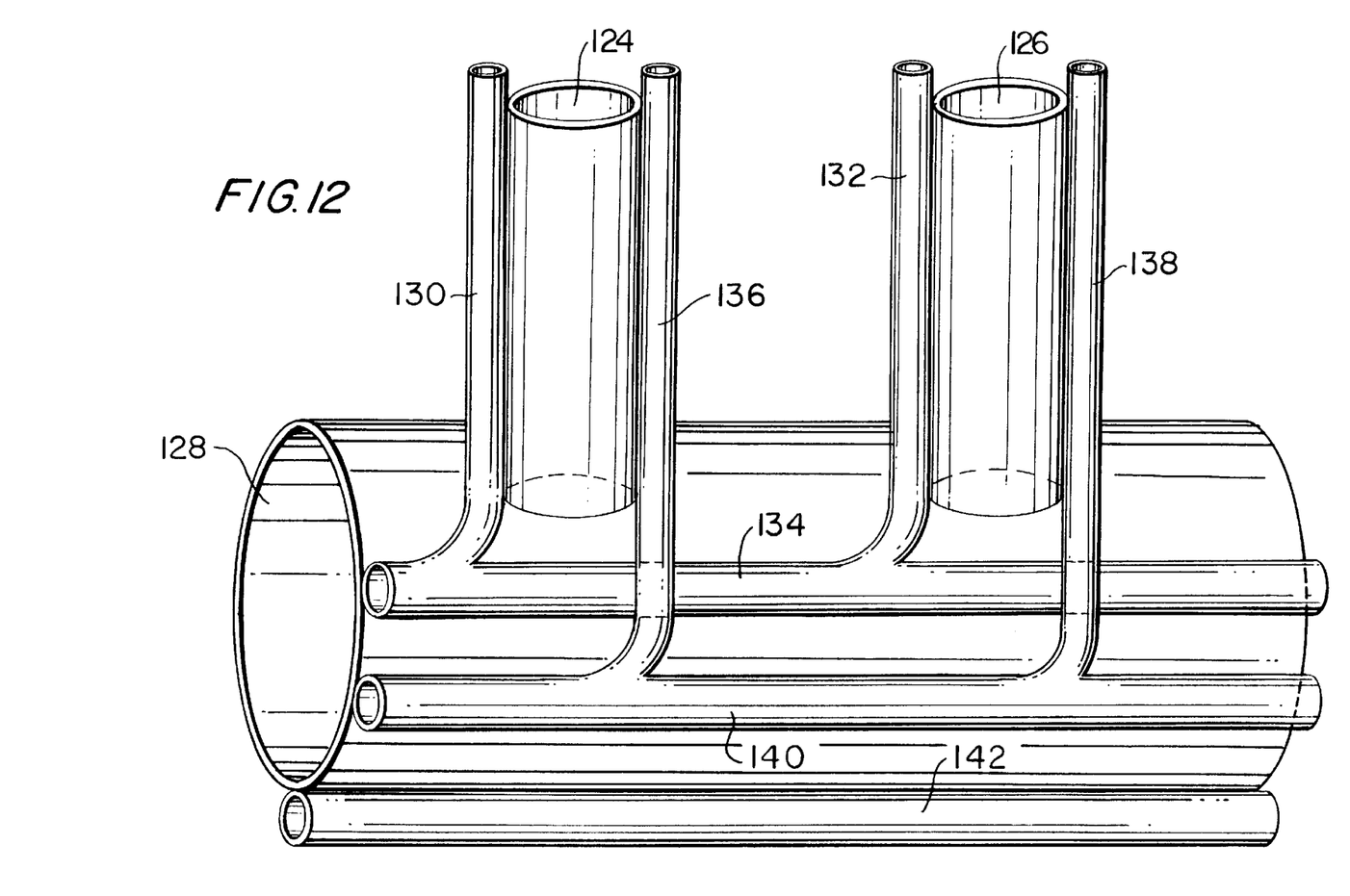
FIG. 12 is a perspective view of another preferred arrangement of the invention showing an arrangement for connecting an end user to a multi conduit system.

FIG. 12 shows another arrangement wherein channels 124 and 126 are in communication with conduit 128; conduits 130 and 132 are in communication with conduit 134 and conduits 136 and 138 are in communication with conduit 140. In this embodiment, conduits 128, 134, 140 and 142 may be main lines running down a street while conduits 124, 130 and 136 may run to a house on the street and conduits 126, 132 and 138 may run to a second house on the street. Conduit 142 may be connected to conduits running to another house (not shown) or may be installed with conduit 128, 134 and 140 and left for possible use in the future.

While the invention has been described with reference to preferred embodiments, it will be understood by those skilled in the art that various changes may be made and equivalents may be substituted for elements thereof without departing from the scope of the invention. For example, the exact arrangement or dimensions of the conduits or the apparatuses used during the pulling/bursting process may be altered while still accomplishing essentially the same result.

In addition, many modifications may be made to adapt a particular situation to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A bursting head for use in rehabilitating an existing underground pipeline comprising:
    (a) a tapered front end, having a diameter less than a diameter of the existing uunderground pipeline and means for connecting the front end to a cable, rod or other movement means;
    (b) a back end having a diameter which is larger than the diameter of the existing underground pipeline; and
    (c) connecting means for removeably connecting a plurality of new conduits to the back end such that the new conduits are arranged form a multi-channel conduit having a central channel and at least one outer channel.

2. The bursting head of claim 1, wherein the connecting means comprises at least two flanges extending from the back end.

3. The bursting head of claim 2, wherein a first of the flanges is mounted centrally on the back end and a second of the flanges is mounted outside the first of the flanges.

4. The bursting head of claim 3, wherein the first of the flanges comprises a metal sheet arranged in a generally circular configuration to extend from the back end and have a diameter substantially equal to or greater than a diameter of the existing underground pipeline, and the second of the flanges is mounted outside the periphery of the first of the flanges.

5. The bursting head of claim 4, wherein the first of the flanges has a central axis substantially aligned with a central axis of the bursting head.

6. The bursting head of claim 1, wherein the back end has a diameter in the range of 3" to 30".

7. A method for rehabilitating and adding functionality to an existing underground pipeline, comprising the steps of:
    (a) removeably connecting a plurality of new conduits to a back end of a bursting head such that the new conduits are arranged to form a multi-channel conduit having a central channel and at least one outer channel;
    (b) inserting the bursting head into the existing underground pipeline to simultaneously burst the existing underground pipeline and insert the plurality of new conduits.

8. The method of claim 7, wherein the central channel is substantially aligned with a central axis of the bursting head and the at least one outer channel is aligned around the periphery of the central channel.

9. The method of claim 8, wherein each of the new conduits is a seperate conduit connected only to the bursting head, such that each of the at least one outer channel may be separately diverted away from the central channel.

10. The method of claim 8, wherein all of the new conduits are removeably connected to each other, such that each of the at least one outer channel may be separately diverted away from the central channel.

11. The method of claim 8, wherein the new conduits are formed into the multi-channel conduit prior to being removeably attached to the bursting head.

12. The method of claim 8, wherein one of the at least one outer channel comprises a solid material suitable for drilling and tapping.

13. The method of claim 7, wherein the central channel has a capacity substantially equal to or greater than a capacity of the existing underground pipeline, and the at least one outer channel has a capacity less than the existing underground pipeline.

14. The method of claim 13, wherein the central channel has a diameter in the range of approximately 4–18 inches, and the at least one outer channel has a diameter in the range of approximately 1–5 centimeters.

15. The method of claim 7, wherein the central channel has a capacity less than a capacity of the existing underground pipeline, and the at least one outer channel has a capacity less than the existing underground pipeline, such that the multi-chamber conduit has a diameter substantially equal to a diameter of the existing underground pipeline.

16. The method of claim 15, wherein the central channel has a diameter in the range of approximately 4–18 inches, and the at least one outer channel has a diameter in the range of approximately 1–5 centimeters.

17. The method of claim 7, wherein the new conduits are comprised of one or more material(s) selected from the group consisting of: high density polyethylene, extra high molecular weight polyethylene, medium density polyethylene, polypropylene, polyvinyl chloride, steel or iron.

18. The method of claim 7, wherein the new conduits are installed in sections having a length of approximately 50–500 feet.

19. The method of claim 7, further comprising the step of redirecting at least a first of the new conduits to a first junction area and running at least a second of the new conduits to a second junction area to construct a plurality of networks, such that the first of the new conduits may be accessed from the first junction area and the second of the new conduits may be accessed from the second junction area.

* * * * *

UNITED STATES PATENT AND TRADEMARK OFFICE
CERTIFICATE OF CORRECTION

PATENT NO.   : 6,702,520 B2  
DATED        : March 9, 2004  
INVENTOR(S)  : Stephen Paletta and Jason Long It is certified that error appears in the above-identified patent and that said Letters Patent is hereby corrected as shown below:

<u>Title page,</u>  
Item [54], please add the following inventor:  
-- Jason Long, Danbury, CT --.

Signed and Sealed this

Eleventh Day of May, 2004

JON W. DUDAS  
*Acting Director of the United States Patent and Trademark Office*